United States Patent Office.

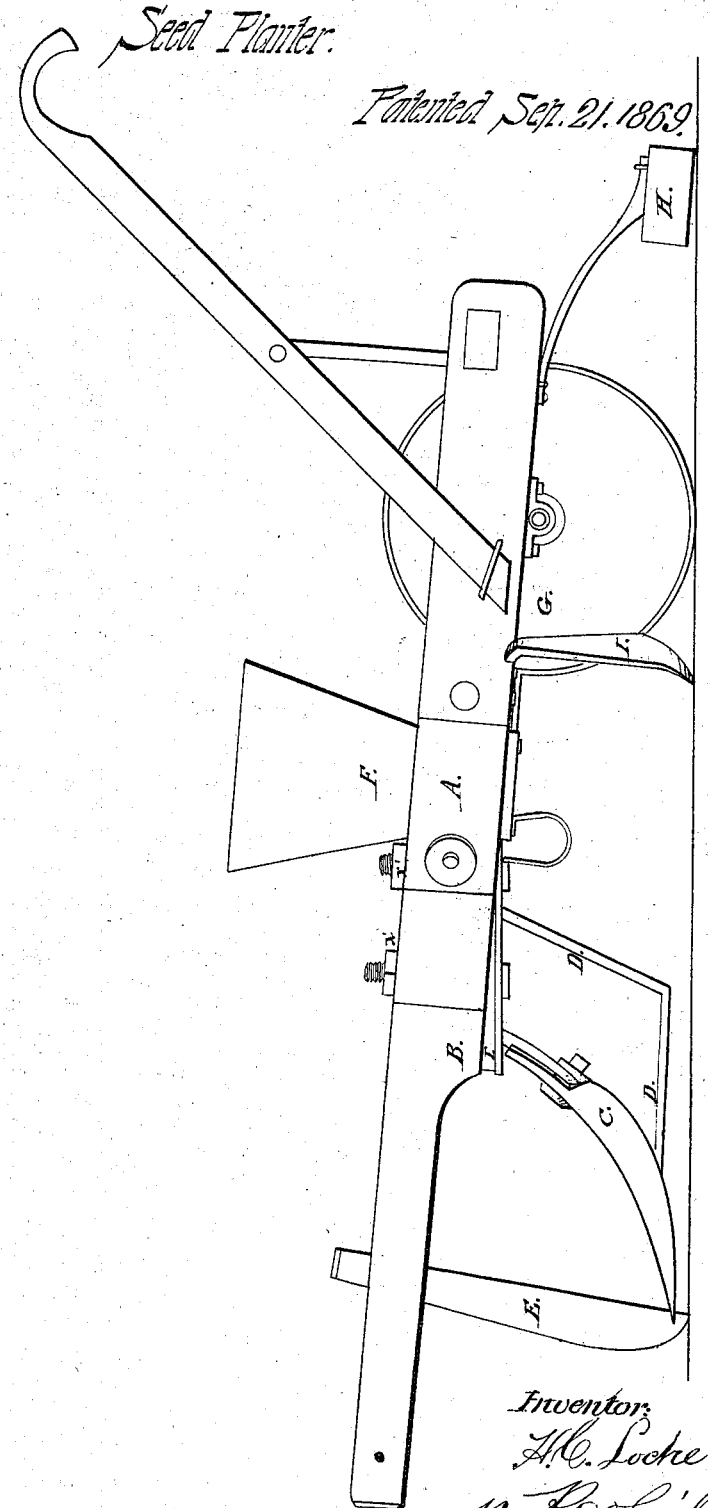

H. C. LOCKE, OF SOMERVILLE, TENNESSEE.

Letters Patent No. 95,121, dated September 21, 1869.

IMPROVEMENT IN SEED-PLANTERS.

The Schedule referred to in these Letters Patent and making part of the same.

*To all whom it may concern:*

Be it known that I, H. C. LOCKE, of Somerville, in the county of Fayette, and State of Tennessee, have invented a new and useful Improvement in Seed or Corn-Planting; and I do hereby declare the following to be a full, clear, and exact description of the same, reference being had to the accompanying drawing, which represents a side elevation of my seed-planter.

My invention consists of an improved seed-planter, arranged and constructed in such a manner that the entire process of planting corn, or other seed similarly planted, is effectually performed.

The construction of a portion of my seed-planter, relating to the operation of the seed-drop, by means of mechanism attached to the wheel G, the arrangement of the frame A with wheel G and drag H, attached thereto, and the position of the hopper F, I have described in my Letters Patent, No. 77,057, dated April 21, 1868.

The construction of the remaining parts to be described, being the shape of the coulter E, and its position with regard to the shovel C, and the attachment of the standard D to the beam B, by which means the shovel C, attached to said standard, is gauged either deep or shallow; and third, the position of the teeth or shovels I with regard to the hopper.

That others may understand the construction and operation of my present improvements, I will give a full description of the same.

The coulter E is formed with its cutting-edge curving under the toe of the shovel, as shown in the drawings, and secured to the beam by some suitable and sufficient means, the straight edge or back resting in a notch cut in the toe of the shovel.

The advantages of having the cutting-edge curved back instead of forward, as usual, are: first, the draught is lessened to some extent; and second, when it comes in contact with roots too large to be severed, or large stones under the surface, it will not be necessary to stop and lift the apparatus over said obstacles, but, striking the curved edge of the coulter, it will ride the plow or shovel over them, without the liability of breaking any of the parts.

The standard D, to which is fastened the shovel C, by means of screw-bolts and nuts $b$, in order that it may be removed and replaced by a plow, is formed an open frame, as shown, the bottom of which forms a sole to run upon the bottom of a furrow, and it is attached to the beam B by screw-bolts and nuts $x\ x'$, by which means, in combination with the wedge L, the shovel attached to said standard may be gauged either deep or shallow.

L is a wedge, having a longitudinal slot cut therein, through which the screw-bolt $x$ passes, thus permitting the wedge to slide longitudinally when the screw-bolts $x\ x'$ are not tightened; the object of said wedge being to gauge the shovel either deep or shallow, by respectively sliding the wedge up further between the standard and beam to gauge the shovel deep, and sliding it in the contrary direction to produce a different effect, the screw-bolts are then tightened, and the shovel is ready gauged.

I are teeth, only one of which is shown, fastened to the frame A behind the hopper, as shown in the drawings, to throw the earth into the furrow after the seed has been dropped therein The combination of these separately-constructed parts works thus:

The hopper being filled with corn, the team attached and put in motion, the coulter and shovel prepare the furrow, the seed-drop, being put in motion by means of a knob attached to the side of the wheel, works a valve or seed-drop connected with the hopper, dropping the seed in equal quantities and at equal distances, the teeth or shovels, being placed behind the hopper in the position shown, throw the earth accumulated on each side of the furrow, in excavating the same, over the seed, after which the wheel compresses the ridge thus formed, to make it more compact, and the drag following, breaks and disposes of the clods.

Having described my invention,

What I claim as new, is—

1. The standard D, constructed as shown, in combination with the separate shovel or plow C, as described.

2. The combination and arrangement of the coulter E, curved backward, as described, the shovel C, and standard D.

3. The wedge L, constructed as described, in combination with the standard D and shovel C, as and for the purpose described.

4. The combination and arrangement, in a seed-planter, of the seed-hopper F, with its dropping-device, the standard D, shovel C, and coulter E.

H. C. LOCKE.

Witnesses:
  THOS. R. COOKE,
  S. F. WOODRUFF.